Figure 1:
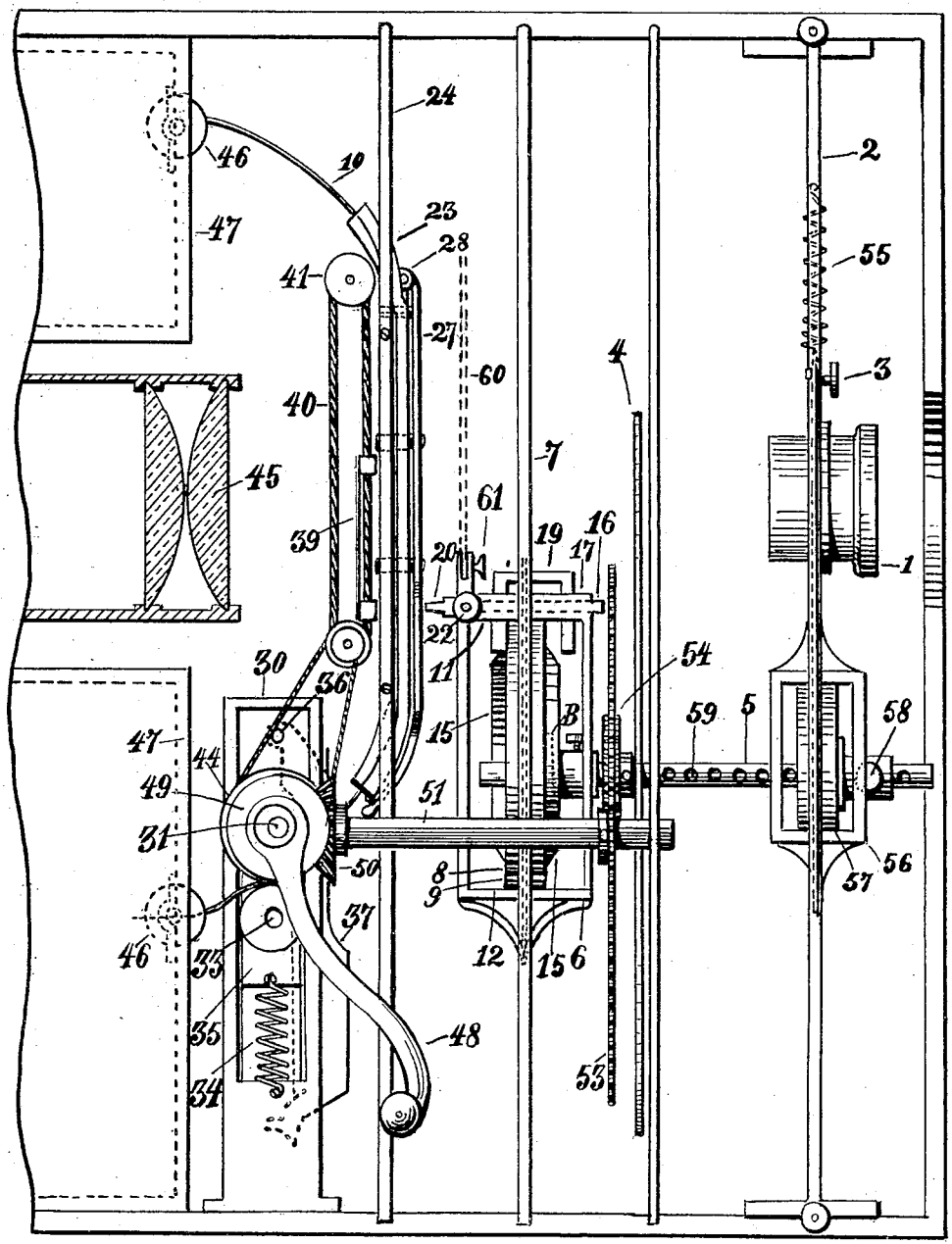

C. KESSES.
TWO-IN-ONE MOTION PICTURE PROJECTOR.
APPLICATION FILED SEPT. 25, 1917.

1,281,253.

Patented Oct. 8, 1918.

INVENTOR.
Charles Kesses

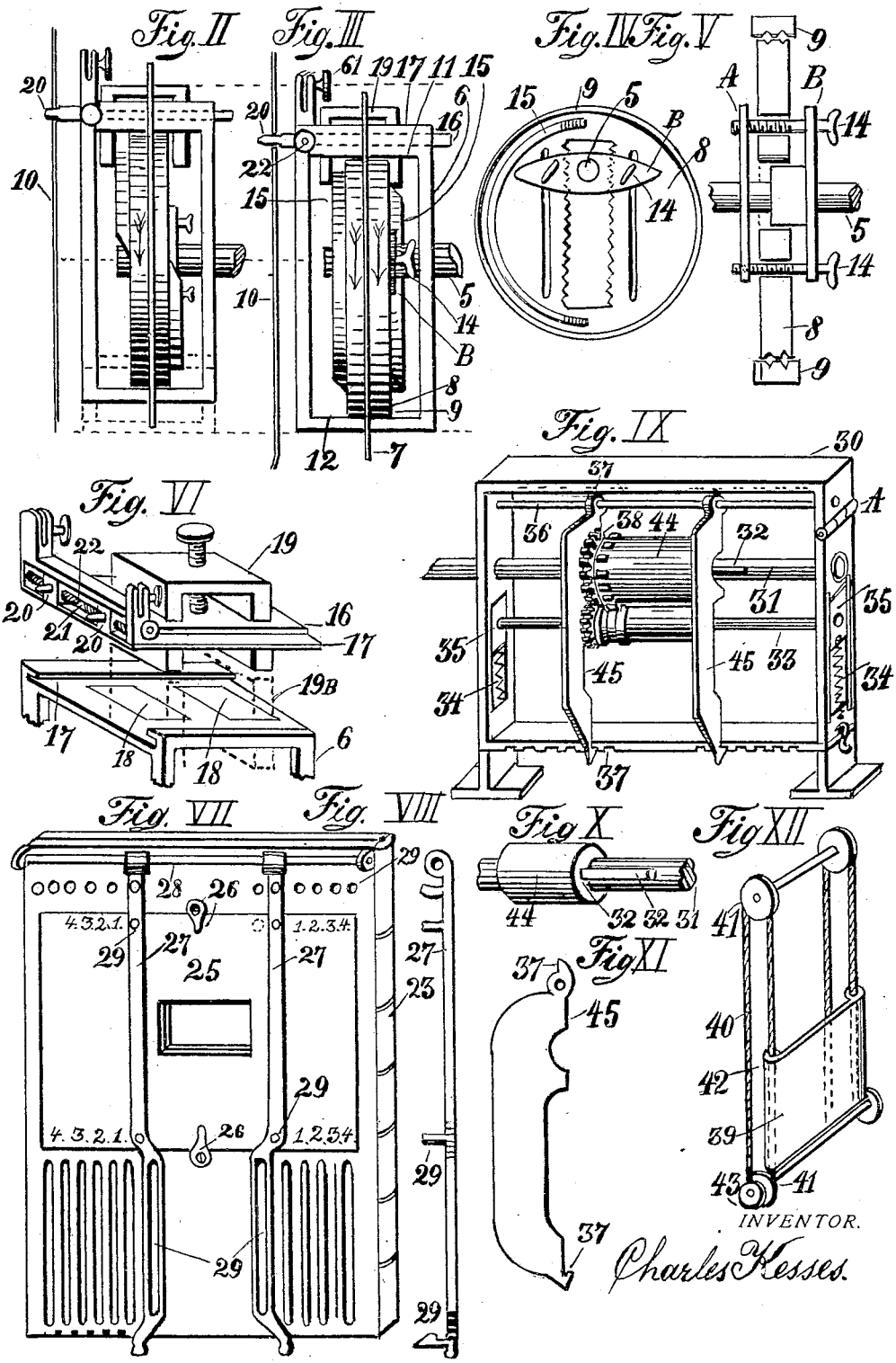

UNITED STATES PATENT OFFICE.

CHARLES KESSES, OF NEW YORK, N. Y.

TWO-IN-ONE MOTION-PICTURE PROJECTOR.

1,281,253.   Specification of Letters Patent.   Patented Oct. 8, 1918.

Application filed September 25, 1917. Serial No. 193,180.

*To all whom it may concern:*

Be it known that I, CHARLES KESSES, citizen of the United States, and resident of New York city, in the county of New York and State of New York, have invented certain new and useful Two-in-One Motion-Picture Projectors of which the following is a specification.

My invention is related to my Patent No. 1,223,341 for a motion picture camera, wherein the pictures are exposed on a constantly running film and is related to that class of machines wherein the pictures are projected with an intermittently running film and the objects of my invention are; first, to provide in one machine two independent film movements, one a constantly running film movement in connection with a synchronously movable lens and the other an intermittent feeding movement, to enable the operator, in case one movement is out of commission to use the other; second, to provide means whereby either can be used for taking, projecting or printing; third, to provide adjusting means whereby the apparatus can be adjusted for different sized pictures and for different widths of film strips, to enable an operator to expose large size successive negatives for printing useful photos on paper for commercial purposes; fourth, to provide an improved intermittent film feeding device, having means for adjusting its movement so that said movement can be regulated for the size of pictures in the height and the length required; fifth, to provide means whereby plain film strips can be operated; this means a big saving, also valuable positive or negative motion picture films wherein the perforation is worn out or imperfect; such films would otherwise be worthless; sixth, to provide an automatic safety door between the projector and the film.

I attain these objects by the mechanism illustrated in the accompanying drawings in which—

Figure I is a side view of the apparatus wherein is shown a film advancing mechanism in its uppermost position.

Fig. II is a view of said film advancing mechanism half way downward.

Fig. III is a view of said mechanism at its lowest position.

Fig. IV is a side view of an eccentric wheel with a regulator B which is operative in said film advancing mechanism.

Fig. V is a vertical cross-section of the eccentric including the regulator.

Fig. VI is a perspective fragmental view of the film advancing mechanism, showing the movably secured pinhead separated from the lower frame.

Fig. VII is a front view of an adjustable film guideway, showing slidably secured guide-arms for the film and for the pins.

Fig. VIII is a side view of said guide arms.

Fig. IX is a perspective view of an adjustable film feeding device, showing slidably secured arms.

Fig. X is a fragmental view of the sprocket wheel from said feeding device showing how to change said sprocket.

Fig. XI is a side view of said arms which are movably secured to the feeding device.

Fig. XII is a perspective view of an automatically closing safety door.

Similar characters refer to similar parts throughout the several views.

I first describe the intermittent mechanical movement of the projector. A lensboard 1 is slidably secured in a rail support 2. A screw 3 secures said lens in a suitable position in said rail. Said support is slidably secured in the projector to allow using different focus lenses. A rotary shutter 4 with one opening is secured to a shaft 5 which is journaled with suitable bearings in the front wall and a partition of the apparatus. Said partition has an opening in the rear of the lens.

An intermittent feeding device is shown in different positions on Figs. II and III. A square frame 6 is slidably secured in a rail support 7. An eccentric wheel 8 is set in bearings in an outside rim 9 to reduce the friction between the eccentric and the plane surfaces 11 and 12 in said frame. Said rim is a trifle smaller than the frame to allow movement between said plane surfaces. Said eccentric and a regulator being shown in Figs. IV and V. Said regulator can be secured to said eccentric in many different positions for the size of pictures required. Said regulator is in two parts A and B screwed together with screws 14. Part B is secured to a shaft 5. Two wings 15, one on each side are secured on opposite sides on said eccentric; to reciprocate a pinhead 16 which is in a horizontal direction slidably secured in rails 17 to the frame 6. The pinhead separated from said frame being shown in Fig. VI. Two openings 18 in the upper part of said frame must be larger than a twin-bolt 19 which is secured with a screw to the pinhead to allow for moving said bolt in the openings 18. A second position of said bolt is shown as a dotted line, $19^B$.

When the eccentric turns, the front wing moves said bolt forward and pushes the pins 20 in the perforation of the film 10. The eccentric turns ¼ revolution and moves the film downward as shown on Fig. II, the lowest position of the pins being shown on Fig. III. The rear wing disengages the pins from the film and the carrier returns to the position shown in Fig. I. Said pins are slidably arranged in a rail 21 which is secured on the pinhead 16. A screw 22 has a right and a left thread. When said screw is turned the pins 20 move nearer or farther apart to fit in the perforations of the film.

A film guide way 23 is in two parts and is hinged together, being shown on Fig. VII. One part of said guide is stationarily secured on a support 24. Corresponding exposing boards 25 for both sides of said guideway, can be changed for larger or smaller center opening ones. Said boards are secured to said guideway with clamps 26. Guide arms 27 shown on Fig. VIII are slidably secured on a rail 28 which is secured to the front part of said guideway. The lower part of said arms are provided with hooks 29 to secure them to the lower part of the film guideway. Each of said arms are provided with three pins 29 to fit in the corresponding openings in the front and the rear exposing boards and in both parts of said guideway to give the film running inside of said way a guide. The round openings in the exposing boards 25 must be in a position to be in line with the corresponding holes on the film guideway for the width of film to be used, as for instance if a 4 inch width film strip is used, then the opening 29 in the exposing boards and in the film guideway must be so far apart to secure the guide arms accordingly to the film guideway to hold the film in position; corresponding numbers show the position of those openings to secure the guide arms.

A film feeding device shown on Fig. IX can be easily adjusted with larger or smaller sprocket wheels or plain rollers 44. One side of a stationary support 30 is on hinges A so it can be opened to change the rollers. The main or power shaft 31 is journaled in the wall of the projector and in said support. A square bolt 32 is secured to said shaft shown in Fig. X to rotate said rollers, which have corresponding openings 32. An idle shaft 33 is journaled in slides 35 which are movable in rails secured on the sides of the support 30. Springs 34 secured below said slide press the rollers together. Arms 45, a side view being shown on Fig. XI are movably secured in a rail 36 which is secured in the upper part of said support. The upper and the lower parts of said arms 37 must fit when in closed position in corresponding grooves 37, to hold any size rollers or sprocket wheels. All rollers or sprocket wheels have gear wheels 38 to rotate them.

Between the exposing opening and the condensers 45 is an automatically closing asbestos door 39. Wires 40 are shown in Fig. 1 running over pulleys 41. Said wire spring passing through loops 42 which are secured in said door. An extension pulley 43 secured to the lower pulley 41 is connected with a wire to a large pulley, secured to the main shaft. When the apparatus is in operation, by the quick action of the wires 40 the door is lifted above the exposing opening and as soon as the apparatus is not acting the door drops by itself to prevent the light from acting on the film.

Turnable film inlets 46 in the film boxes 47 give the film going in or out of said boxes, if the film box is full or almost empty the right position so that the film will not be bent. To exchange a film box, turn the slot downward until slot will not show and the box will be light proof.

The driving mechanism is as follows. The main shaft 31 is driven from a crank 48. A bevel gear 49 secured to said shaft is meshed to a bevel gear 50, which is secured to a shaft 51. Said shaft is journaled in a support and a partition in the apparatus. A gear 53 secured to said shaft is meshed to a gear 54 which is secured to the shaft 5.

The projector which operates with a constantly running film is the same as described in my Patent No. 1,122,341. The lens 1 is set in an aluminium lens board, which runs in rails 2 up and down. A spring 55 is just strong enough to lift the lens. Said spring is secured to said lens board and upper part of camera. A square case 56 and an eccentric 57 with a regulator (same model as the eccentric 8) reciprocates the lens. To connect this movement to the driving mechanism secure a screw 58 in a suitable position in one of the openings 59 in the shaft 5. Release the screw 3 on the lens board, remove the twin-bolt 19 and secure the exposing board 60 with screws 61 to the square case 6, as shown in dotted lines in Fig. I.

The eccentric for the lens slide and the other for the exposing slide must be regulated. If the size of the pictures are ¾ inch high, then the eccentric must be set with the regulators to reciprocate said slides each way ⅜ of an inch, both movements combined must be ¾ of an inch and the opening in the film guide way must be double the height of the picture.

Different widths of unperforated film strips or different width of a positive or negative film wherein the perforation is worn out or imperfect can be exposed, projected or printed with the apparatus by using the constantly running film movement.

By using this movement described in my Patent No. 1,223,341 insert plain rollers 44, gear wheel 38 secured to said rollers to rotate them. The upper roller or operating roller shown in Fig. X must have exactly the correct diameter to transport by each turn of the driving shaft 31, film for 8 pictures, for the size of said picture required. the gear wheel 53 turns 8 times the gear wheel 54 which rotates both eccentrics 8 and 57.

From this it follows that by every turn of the driving shaft the roller 44 will rotate once, furnishing film for 8 pictures; the lens 1 and the exposing board 60 is also lifted and lowered 8 times and the shutter is so proportioned as to be only open, when the lens, the exposing board and the constantly running film 10 go down together in harmony.

When the apparatus is used as a projector, secure a positive film in the upper film box, move turnable film inlet forward; let the film pass down between film guide way, between film feeding rollers, through the film inlet in the lower film box; to be secured to an empty spool. The first picture must be exactly in the opening of the film guideway, place the condensers in position and it is ready for operation.

When using for a camera place the sensitive film in same way and close the apparatus in the rear.

When using as a printer, to print duplicates from a negative film on a sensitive film place a second roller above the sensitive film in the upper film box, feed both films together through the apparatus same as usual and secure the negative film on an empty spool below the sensitive film in the lower film box. When printing use a milky glass between the lens and the electric light.

I am aware that prior to my invention projectors have been built but I have never seen, two projectors in one, second; using of plain and perforated film, third; larger or small pictures, fourth; one frictionless eccentric which can be regulated for the length of stroke required.

What I claim as new and desire to secure by Letters Patent is—

1. In a two in one motion picture projector, a film guideway adjustable for different widths of films, an intermittent film advancing mechanism and a continuous film advancing mechanism, a projecting lens carrier, means for reciprocating said carrier synchronously with the continuous film advancing mechanism, means for rendering said last mentioned means inactive and fixing the position of said lens carrier, and means for rendering the intermittent feed mechanism inactive to permit feeding of the film solely by the continuous film advancing mechanism, whereby the apparatus may be used either as an intermittent film advancing projector or as a continuous film advancing projector at the will of the operator.

2. In a two in one motion picture projector, a film guideway adjustable for different widths of film, an intermittent film advancing mechanism and a continuous film advancing mechanism, means for rendering the intermittent film advancing mechanism inactive to permit feeding of the film solely by the continuous film advancing mechanism, said continuous film advancing mechanism comprising interchangeable feed rollers of different lengths adapted to feed film of different widths.

3. In a motion picture projector a continuous film advancing mechanism comprising interchangeable film feeding rollers, one of which has film engaging teeth and another of which is plain, whereby said mechanism may be adjusted to feed perforated or unperforated film.

Signed at New York in the county of New York and State of New York this 24 day of September A. D. 1917.

CHARLES KESSES.

Witnesses:
 Louis Meyers,
 Charles J. Wiley.

Copies of this patent may be obtained for five cents each, by addressing the "Commissioner of Patents, Washington, D. C."